March 14, 1939. F. M. REID 2,150,701
RETRACTABLE TRAILER SUPPORT
Filed May 2, 1938
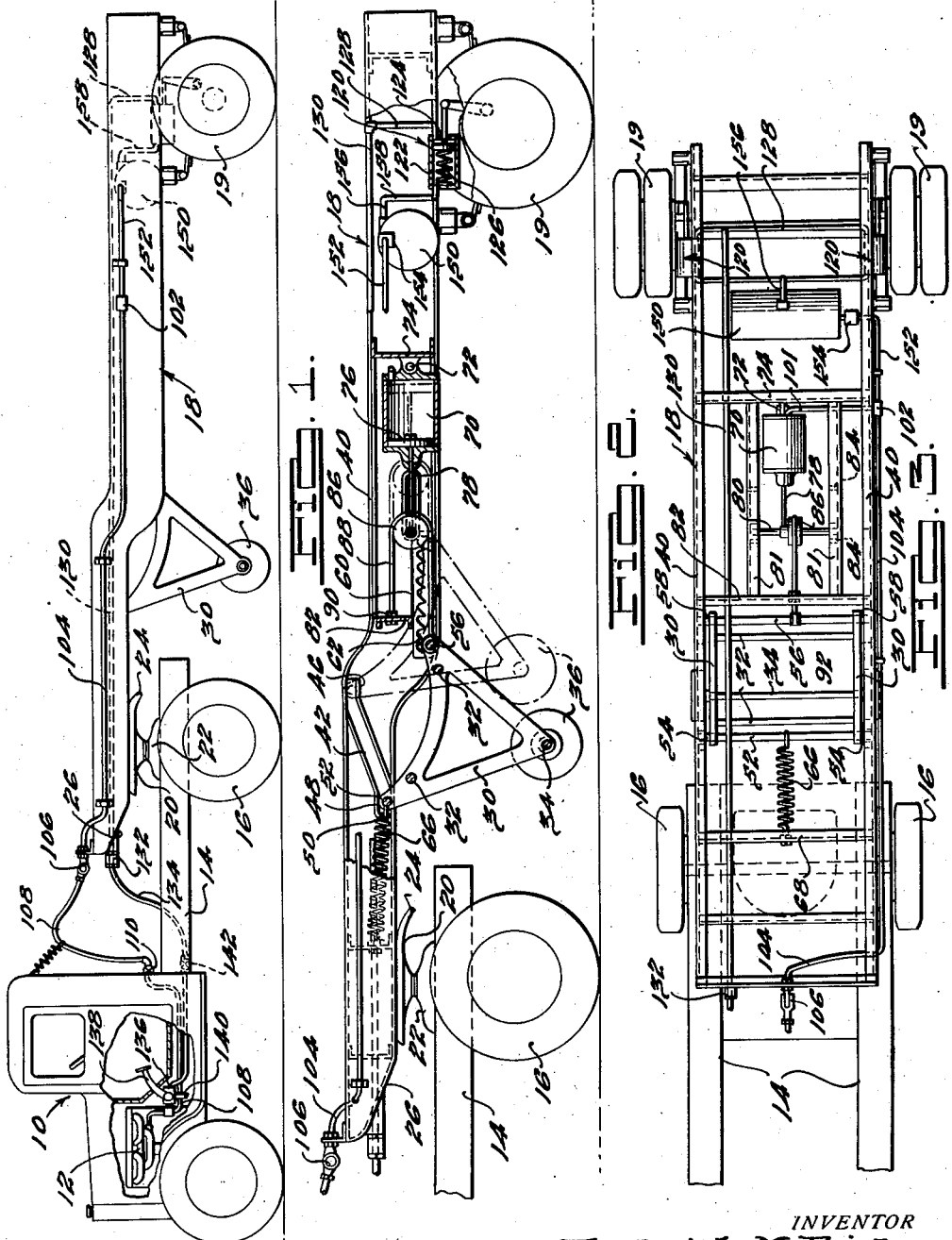
INVENTOR
Frederick M. Reid.
BY
Harness, Dickey & Pierce.
ATTORNEYS.

Patented Mar. 14, 1939

2,150,701

UNITED STATES PATENT OFFICE 2,150,701

RETRACTABLE TRAILER SUPPORT

Frederick M. Reid, Detroit, Mich., assignor to Fruehauf Trailer Company, Detroit, Mich., a corporation of Michigan Application May 2, 1938, Serial No. 205,466

7 Claims. (Cl. 254—86)

The present invention relates to tractor and trailer vehicle structures, and particularly relates to an improved retractible support for trailer vehicles with improved means for controlling the raising and lowering of the retractible support to and from inoperative and operative positions.

One of the primary objects of the present invention is to provide improved means for raising and lowering the retractible support on trailer vehicles.

Another object of the invention is to provide improved raising and lowering means for the retractible support on trailer vehicles in combination with the suction intake of an automotive engine on a tractor, whereby the retractible support is always in its raised position while the tractor or trailer are connected together and the engine running.

Another object of the invention is to provide improved means for lowering the retractible support to its supporting or operative position and for locking the support in such position against accidental displacement.

Another object of the invention is to provide improved means for raising and lowering the retractible supports which are operated by suction intake of an automotive engine in combination with suction means operating vacuum brakes on the rear ground wheels of the trailer.

Another object of the invention is to provide improved operating means for raising and lowering the retractible support on trailer vehicles in combination with the suction intake of an automotive engine on a tractor, whereby, when the connection between the operating means and the automotive engine is broken, the retractible support is automatically lowered to its supporting position without the necessity of operating hand valves or such.

Other objects of the invention will become apparent from the following specification, the drawing relating thereto and from the claims hereinafter set forth.

In the drawing, in which like numerals are used to designate like parts in the several views throughout:

Figure 1 is a side elevational view of a tractor and trailer structure, with a portion of the tractor broken away, illustrating an embodiment of the present invention;

Fig. 2 is a fragmentary side elevational view with parts broken away showing parts in elevation and parts in cross section, of the structure illustrated in Fig. 1 on a slightly enlarged scale; and Fig. 3 is a top plan view on a slightly reduced scale of the structure illustrated in Fig. 2.

Semi-trailer vehicles are usually provided with a frame or platform with ground wheels at the rear end for supporting the same; and the forward end is usually provided with an upper fifth wheel construction which rests upon a lower fifth wheel construction of a tractor or truck. The tractor is detachable from the semi-trailer and there is provided a retractable support for holding up the forward end of the trailer when the tractor is disconnected therefrom.

According to the present invention a retractable support is provided which is raised to its inoperative or nonsupporting position by a pneumatic means. The pneumatic means is connected through a conduit line to the intake manifold on the automotive engine of the tractor; and the connection is formed in separable sections, so that upon disconnecting the connection when the trailer is disconnected from the tractor, the supporting frame is automatically lowered to its operative or supporting position without the necessity of turning or adjusting hand valves to insure operation of the supporting means. By this automatic actuation of the supporting frame, there is positive assurance that the front end of the trailer will be supported when it is disconnected from the tractor, thereby overcoming the danger of negligent operation of hand valves, such as those in prior structures.

Referring to the drawing, a usual automotive tractor 10 is provided having a usual gasoline engine 12, and being provided with a rearwardly extending frame 14 with ground wheels 16 connected thereto adjacent the rear end thereof in the usual way.

A semi-trailer generally indicated at 18 has ground engaging wheels 19 mounted at the rear end thereof in the usual way. The forward end of the trailer is upwardly offset and is pivotally and detachably connected to the tractor 10 by a pivotal connection such as the fifth wheel structure. The fifth wheel structure is preferably of the type disclosed in detail in the patent to Frederick M. Reid, No. 1,925,279, issued September 5, 1933; and includes a downwardly directed king-pin member mounted on the trailer 18 adjacent the front thereof. The king-pin is adapted to engage a lower fifth wheel member 20, of the structure disclosed in the above mentioned patent, which is pivotally connected to the frame 14 through brackets 22. The lower fifth wheel member 20 is preferably curved downwardly adjacent the rear edge thereof as indicated at 24;

and the front edge of the trailer 18 is preferably sloped downwardly and rearwardly as indicated at 26, so that as the tractor 10 is backed under the forward edge of the trailer 18 the downwardly sloping edge 24 slidably engages under the sloping edge 26 and raises the forward end of the trailer 18 as the fifth wheel member is slid under the trailer to its position surrounding the kingpin.

According to the present invention, the means for supporting the forward end of the trailer when it is detached from the tractor comprises a rigid frame 30 which is of a triangular shape, there being one such frame carried on each side of the trailer frame. Transversely extending bracing members 32 connect the side frame members 30 so that the members 30 are caused to move in unison as they are swung to and from supporting and non-supporting positions. A transversely extending axle member 34 is received through openings in the bottom end of each of the triangular frame members 30 and is adapted to pivotally support wheels 36 which are adapted to engage the ground when the frame 30 is in its supporting position and which are adapted to be raised above the ground when the trailer is connected to the tractor.

The frame of the trailer 18 preferably includes longitudinally extending channel members 40 forming the sides thereof; and mounted on each side of the trailer frame is a slideway 42 which is disposed at an angle to the vertical and has a substantially straight portion 46 adjacent the termination of its upper end and a substantially straight portion 48 adjacent the termination of its lower end. The guideway has an end wall 50 which acts as a stop to limit the travel of one end of the frame member 30 in a manner which will become more apparent from the following description. A transversely extending rod member 52 is received through openings in the upper forward ends of the frame members 30 and projects outwardly beyond each of the members 30. The outwardly projecting portions 54 are adapted to be slidably received in the slideways 42, so that as the portions 54 slide upwardly within the slideways the forward end of the frame member 30 is lifted upwardly; and conversely as the portions 54 move downwardly, the forward end of the frame members 30 are moved downwardly.

Another transversely extending rod member 56 is disposed through openings in the rear upper ends of the members 30 and extends outwardly therebeyond as indicated at 58. The outwardly extending portions 58 are slidably carried by slideways formed by the lower inwardly disposed flanges on the side channel members 40; and to guide and to limit the sliding movement of the portions 58 on the side frame members 40 a substantially U-shaped member 60 is fixed to the frame members 40 so that the ends of the members 60 limit the movement of the projection 58. The base of the member 60 is provided with downwardly extending recesses in the form of notches 62 which are adapted to lock the frame against accidental displacement when it is in its supporting position. While it is preferable to have the latter mentioned slideways substantially horizontal, such slideways could be disposed at slight angles to the horizontal and at substantial angles to the angle of the slideways 42.

The supporting frame members 30 are so positioned that they tend to drop downwardly by gravity to their supporting position. In order to insure the positioning of the frame members 70 in their supporting position, a spiral spring member 66 is attached at one end to the cross-member 52 and is attached at its opposite end to a transversely extending frame member 68 on the trailer 18. The slope of the slideway 42 controls to a certain extent the necessity for the spring 66 and the required strength of the spring 66; that is, for a relatively steep incline on the slideway 42 a spring of less strength is required. It is, however, desirable that the spring 66 be provided so that as the projections 54 are drawn downwardly on the guideways 42, they are held against the end wall 50 so that the projections 58 on the cross member 56 are caused to pivot around the projections 54 and engage in one of the notches 62 when the trailer is supported on the frame 30.

Also according to the present invention, in order to raise the frame 30 to its non-supporting or inoperative position, a vacuum cylinder 70 is provided which is pivotally attached at 72 to a transversely extending frame member 74 which is attached to the side frame members 40. The cylinder 70 has a reciprocating piston 76 therein with a piston rod 78 projecting therefrom. The piston rod 78 is secured to a transversely extending rod member 80 which is slidably received within guideways formed by longitudinally extending channel members 81 which are fixed at one end to the transversely extending frame member 74 and at their other end to another transversely extending frame member 82. The rod member 80 is adapted to be slid back and forth within the channel members 81 as the piston rod 78 is reciprocated, and stops 84 are preferably provided in the channel members 81 to limit the movement of the rod member 80.

A pulley 86 is rotatably mounted on the rod member 80; and a flexible cable 88 has one end 90 fixed to the transversely extending frame member 82. The cable is passed around the pulley 86 and is secured at 92 to the transversely extending member 56 on the frame member 30. The pulley and cable arrangement reduces the size of the cylinder 70 necessary to raise the supporting frame 30 to its inoperative position.

The right hand end of the cylinder 70, viewing Fig. 2, is connected through a conduit member 101 to a T connection 102 which in turn is connected with another conduit member 104 to a separable connector 106. A flexible conduit member 108 is connected to the separable connector 106 and has a hand valve 110 interposed in the line between the connection 106 and the intake manifold of the automotive engine 12 to which the conduit 108 extends and is in communication. The hand valve is closed when the trailer and tractor are disconnected, and open when they are connected. The hand valve is illustrated, but it is to be understood that the connection 106 could be of such conventional construction that the line 108 is closed to atmosphere when the connection 106 is broken. At all times while the engine is running and the trailer 18 is connected to the tractor 10, a vacuum is created within the cylinder 70 and the piston 76 is drawn to the right, viewing Fig. 2, so that the supporting frame is in its non-supporting position. The rear upper ends of the frame members 30 are then caused to move toward the right, and the upper forward ends of the members 30 are caused to ride up the slideways 42 from the position illustrated in full lines in Fig. 2 to the position indicated in broken lines. By breaking the connection at 106, the vacuum within the chamber 20 is broken and the spring 66 automatically pulls the forward top ends of the frame member 30 down the inclined slideway 42, so that the frame members 30 are in their operative or supporting position. The tractor 10 then may be separated from the trailer 18 and the supporting frame 30 is in its supporting position. As the wheels 36 engage the ground, the frame 32 is caused to pivot about the projections 54 and the projections 58 are engaged in one of the notches 62 so that the supporting frame is locked in its supporting position.

While the present invention is particularly adapted for use with tractors employing gasoline engines as the source of motive power, according to the broader aspects of the present invention, it is also adapted for use with tractors employing other types of motive power such as Diesel engines. In the latter event, a vacuum pump could be provided for connection with the cylinder 70 for operation of the piston rod 76. Also, a compressor could be used in which event, it would be merely necessary to change the inlet for the conduit 101 from the rear end of cylinder 70 to the forward end of the cylinder so that the power stroke of the piston would be in the same direction as that described above.

The ground wheels 19 at each side of the trailer 18 adjacent the rear thereof are each provided with conventional vacuum braking mechanisms generally indicated at 120. Each braking mechanism 120, which is shown by way of illustration, includes a cylinder 122 having a reciprocating piston 124 therein which is constantly urged to its non-braking position by a spiral spring 126 mounted within the cylinder 122. A conduit member 128 communicates with the rear end of each of the cylinders 122 and is in communication with an elongated flexible conduit member 130 which extends longitudinally of the trailer 18 and is fixed to a separable connector 132. The connector 132 provides communication between the conduit member 130 and another flexible conduit member 134 which is in communication with the line 108 to the intake manifold of the engine 12. Means 136 are introduced in the line 134 and are operatively connected with the foot brake pedal 138 so that when the brake pedal 138 is depressed the lines 134, 130 and 128 are vented to the atmosphere through a vent 140. When the brake pedal is depressed, communication between the means 136 and the intake manifold is shut off so that vacuum in the line 108 is not destroyed. A hand valve 142 may be interposed between the connection 132 and the means 136 so that when the connection 132 is broken and the pedal 138 is in its upward position, the hand valve may be closed so that the manifold is not open to the atmosphere.

A vacuum tank 150 is mounted to the trailer 118 adjacent the rear thereof and communicates with the line 104 through the T connection 102 by means of a conduit 152. A check valve 154 is interposed in the line 152 so that when the connection 106 is broken, the vacuum within the tank 150 is not open to the atmosphere. The tank 150 has a conduit member 156 communicating therewith which in turn communicates with another conduit member 158. The conduit member 158 extends transversely of the trailer and communicates with the interior of each of the cylinders 122 through the forward wall thereof, viewing Fig. 2.

When the trailer is connected to the tractor, a vacuum exists on both sides of the piston 124 within each cylinder 122. When the brake pedal 138 is depressed, as explained above, the cylinder 122 to the right of the piston 124, viewing Fig. 2, is vented to the atmosphere; and the vacuum within the tank 150 with the atmospheric pressure on the opposite side of the piston causes the piston to move to the left, viewing Fig. 2, thus applying the brakes. When the trailer is disconnected from the tractor, the line 128 is vented to the atmosphere and the vacuum within the tank 150 causes the piston 124 to move to its braking position so that the brakes are constantly applied while the trailer is disconnected.

Formal changes may be made in the specific embodiment of the invention described without departing from the spirit and substance of the invention, the scope of which is commensurate with the appended claims.

What is claimed is:

1. In a semi-trailer, a rigid frame for supporting the semi-trailer when it is disconnected from a tractor, means connecting the frame to the semi-trailer so constructed as to permit one end thereof to be moved upwardly and another end to be moved longitudinally of the semi-trailer, resilient means constantly urging said one end downwardly, and means for moving said one end upwardly when said semi-trailer is attached to a tractor.

2. In a semi-trailer, a frame for supporting the semi-trailer, an inclined slideway for supporting one end of said frame, means positioned to the rear of the slideway and connected to the frame in such a way as to pull on the frame in the general direction of the inclined slideway whereby the frame is pulled up the slideway to inoperative position, and resilient means engaging said one end of the frame to constantly urge said one end down said slideway to operative position.

3. In a semi-trailer, a rigid frame for supporting the semi-trailer, an inclined slideway for supporting one end of the frame, another slideway at an angle to the first mentioned slideway for supporting another end of said frame, said last named slideway being formed with notches therein adapted to engage said frame when it is in its supporting position to thereby prevent accidental displacement of said frame.

4. In a semi-trailer, a rigid frame for supporting the semi-trailer, an inclined slideway for supporting one end of the frame, a substantially horizontal slideway for supporting another end of said frame, said last named slideway having notches formed therein adapted to engage said frame when said frame is in its supporting position to prevent accidental displacement of said frame, resilient means constantly urging said frame to its supporting position, and means for moving said frame to its non-supporting position.

5. In a semi-trailer, a generally triangular rigid frame for supporting the semi-trailer, an inclined slideway for supporting one end of the frame adjacent the top thereof, a substantially horizontal slideway for supporting the other end of said frame adjacent the top thereof, said last named slideway being formed with notches therein adapted to engage said frame when it is in its supporting position, resilient means engaging said one end of the frame to constantly urge said one end down said slideway to operative position, means limiting the downward movement of said one end to thereby cause said other end to engage in one of said notches, and means for raising said one end of said frame to inoperative position.

6. In a semi-trailer, a frame for supporting the semi-trailer, an inclined slideway for supporting one end of said frame, said slideway terminating in a substantially horizontal portion having stop means associated therewith, means positioned to the rear of said slideway and connected to the frame in such a way as to pull on the frame in the general direction of the inclined slideway, whereby the frame is pulled up the slideway to inoperative position, and resilient means engaging said one end of the frame to constantly urge said one end down said slideway to operative position.

7. In a semi-trailer, a rigid frame for supporting the semi-trailer, an inclined slideway for supporting one end of the frame, said inclined slideway terminating in substantially horizontal portions adjacent each end thereof, stop means associated with one of said horizontal portions, another slideway at an angle to the first mentioned slideway for supporting another end of said frame, said last named slideway being formed with notches therein adapted to engage said frame when it is in its supporting position to thereby prevent accidental displacement of said frame.

FREDERICK M. REID.